Aug. 22, 1967 H. JANSSEN 3,337,794
FOCUSED WELL LOGGING SYSTEM USING ZERO
POTENTIAL REMOTE ELECTRODE
Filed May 6, 1964
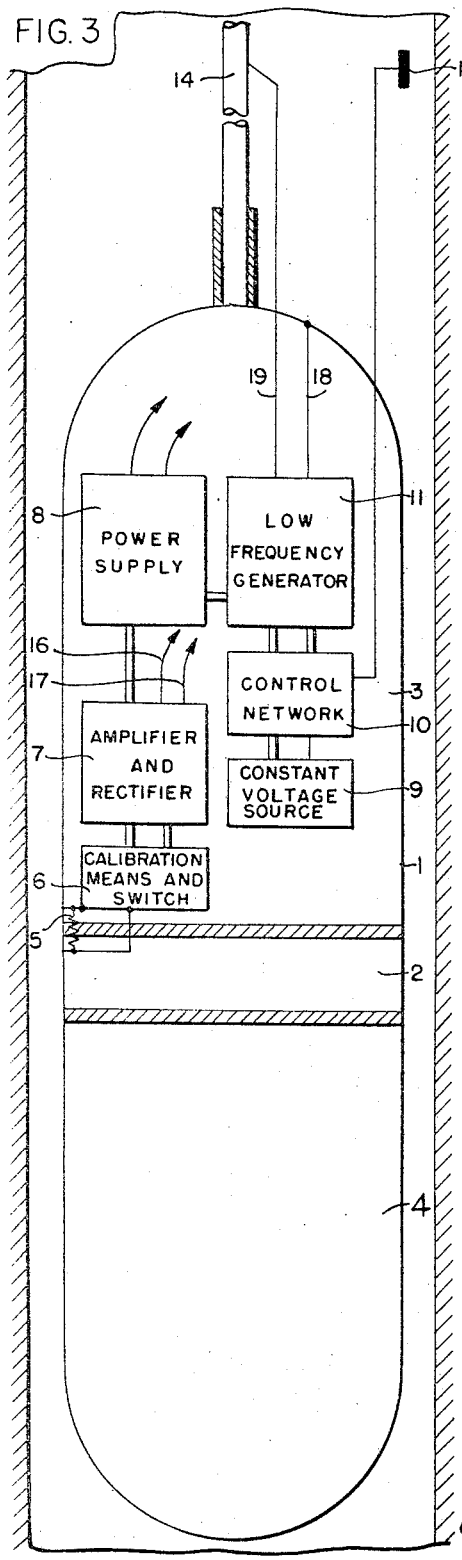
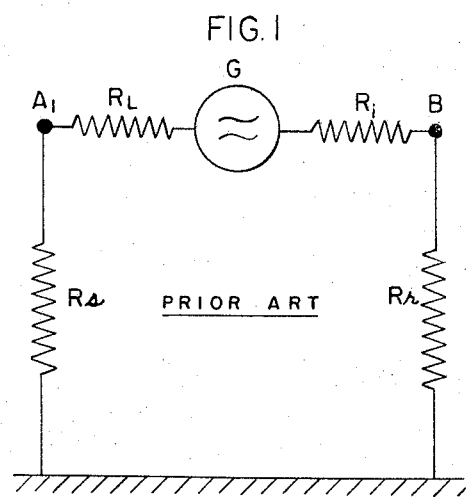
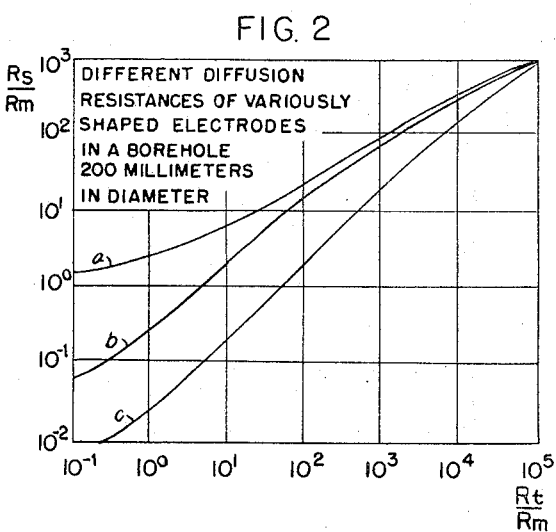
INVENTOR:
HERMANN JANSSEN
BY
Mason, Kolehmainen, Rathburn & Wyss
ATT'YS

United States Patent Office 3,337,794
Patented Aug. 22, 1967

3,337,794
FOCUSED WELL LOGGING SYSTEM USING ZERO POTENTIAL REMOTE ELECTRODE
Hermann Janssen, Kiel, Germany, assignor, by mesne assignments, to PGAC Development Company, Houston, Tex., a corporation of Texas
Filed May 6, 1964, Ser. No. 365,294
3 Claims. (Cl. 324—10)

The present invention relates generally to well logging by measuring the conductivity or resistivity of earth strata traversed by a borehole and is more particularly concerned with a new and improved method and apparatus for obtaining more accurate resistivity measurements in systems of the type wherein current flow from a measuring electrode into the earth formations is substantially confined to a path extending normal to the axis of the borehole.

It is well known that conventional resistance measurement methods furnish curves or measurements which are not only difficult to analyze because of poor differentiation between measurements relating to different strata but which are also inefficient in establishing accurate values for the specific strata resistances of thin seamed strata or layers characterized by large or substantial resistance contrasts $Rt/Rm$ in areas where substantial differences exist between the specific resistance $Rt$ of the strata and the specific resistance $Rm$ of the drilling fluid (mud) in the borehole. In an attempt to solve this problem resistance measuring probes have been used in which focusing electrodes are arranged above and below the measuring electrode to compel the measuring current to flow from the measuring electrode into the strata in a direction extending perpendicular to the axis of the borehole.

These focusing electrodes are conventionally controlled by control or stabilizing means which adjust the focusing electrodes so that they maintain the required potential for this purpose. In this manner the difference of potential existing between the measuring electrode and a remote reference electrode is proportional to the specific resistance of the traversed earth formation or stratum. The amplifiers used for maintaining the required potential must possess a very high amplification factor and this may easily induce instabilities and a tendency to oscillation. Accordingly, it has frequently been attempted to use more dependable measurement methods. For example, instead of measuring the specific resistance of the stratum it has been proposed to measure the specific conductivity of the stratum and then calculate the resistivity characteristics with electrical computers, the so-called reciprocal projection devices, which convert the measured conductivity values into resistance values. These computed resistance values are recorded simultaneously with the measured conductivity values on a film or the like. Focused resistance measurements are carried out with a constant current flowing from the measuring electrode into the earth formation and the potential of this measuring electrode is then measured in relation to an infinitely distant ground point. Focused conductivity measurements on the other hand require that the potential of the entire electrode arrangement (the measuring electrode with the focusing electrodes) be maintained at a constant potential with respect to the infinitely distant ground point and what is measured is that portion or amount of the supplied current which, under these conditions, passes from the measuring electrode, at an angle perpendicular to the axis of the borehole, into the stratum.

The conventional methods which have been used heretofore are based on the assumption that they satisfactorily fulfill the theoretical requirements by utilization of generators with a relatively low internal resistance and a constant output voltage, or by maintaining the potential of the measuring probe (measuring electrode and focusing electrode) constant with respect to a distantly located current-return electrode (see U.S. Patent No. 3,031,612, of Apr. 24, 1962). As will be shown hereinafter, this assumption is erroneous because the assumed theoretical conditions cannot be completely satisfied. FIG. 1 illustrates the conditions prevailing in a typical electrical circuit characteristic of systems heretofore used in the prior art. A generator G having an internal resistance or impedance $Ri$ is connected through the resistance of a lead RL to a measuring probe $Al$ and also to a current return electrode B. The measuring probe $Al$ possesses a diffusion resistance (resistance of earth plate) $Rs$ with respect to the infinitely distant ground. The current return electrode B possesses a similar diffusion resistance $Rr$. If one considers the clamped attachment of both ($Al$ and B) to the generator G then they are arranged in series. RL may be kept small with respect to all other resistances and therefore the voltage of the generator (which is assumed to be constant) will be divided between the two diffusion resistances $Rs$ and $Rr$. The theoretically required condition, however, that a constant potential for the measuring probe $Al$ be maintained with respect to the infinitely distant ground will only be met if (1) the diffusion resistance $Rr$ of the current return electrode (B) is negligible with respect to the diffusion resistance $Rs$ of the measuring probe ($Al$); or if (2) the relationship $Rs/Rr$ is constant. Both of these requirements can be realized only to a very limited extent as will be evident by referring to the series of curves $a$, $b$ and $c$ shown in FIG. 2. The curve $a$ shows the quotient of the diffusion resistance $Rs$ of a given electrode of predetermined size and shape divided by the resistance $Rm$ of drilling mud plotted against the resistance contrast $Rt/Rm$ for a "normal" electrode, i.e. a circular electrode like the current return electrode B. This curve shows that the quotient $Rs/Rm$ increases as the resistance contrast $Rt/Rm$ increases. The points for plotting the curve may be obtained by utilizing different values of $Rm$ and measuring the effect upon the diffusion resistance quotient and upon the resistance contrast. The curve $b$ is identical to curve $a$ but shows these values related to the annular measuring probe $Al$ which is of different size and shape than the electrode assumed for curve $a$.

The curve $c$ illustrates the diffusion resistance for a long, thin electrode 50 meters in length. From these curves one can immediately deduce that the diffusion resistance of the current-return-electrode B is sometimes substantially larger (particularly when small resistance contrasts are involved) than the diffusion resistance of the measuring probe $Al$ so that sometimes less than 10% of the generator voltage will be applied to the measuring probe while 90% of the generator voltage will be applied to the diffusion resistance of the current-return-electrode.

If the current-return-electrode is disposed adjacent an earth formation of high specific resistance while the measuring probe is positioned adjacent a stratum of low specific resistance the potential formed by the measuring probe will drop and the specific strata resistance measurement obtained will indicate a value substantially in excess of the actual or true value.

On the other hand, if the current-return-electrode B is disposed adjacent a highly conductive stratum and the probe $Al$ is positioned adjacent a somewhat less conductive or poorly conducting earth formation almost all of the generator voltage will be applied to the diffusion resistance of the measuring probe and, accordingly, one will again obtain a wrong and incorrect impression because the reading indicates a highly conductive stratum which in fact is incorrect.

One object of the present invention is to provide a novel method and apparatus for overcoming the disadvantages discussed above.

Another object of this invention is to reduce the aforementioned disadvantages of the conventional and known methods to their lowest possible point as regards their technical importance and, hence, to provide a much more dependable indication (or record) of the specific resistances of earth strata.

The foregoing and other objects are realized, in accordance with the present invention, by utilizing a current return electrode of a length sufficient to span several subsurface strata. As is evident from the graph $c$ in FIG. 2, the diffusion resistance for long length electrodes is always less than the diffusion resistance for the measuring electrode when the same resistance contrast exists. Also this value is substantially smaller than the diffusion resistances of normal electrodes taken over large areas. For this reason, in accordance with the present invention, the metal sheath of the measuring cable is employed as the current-return-electrode. This has the additional advantage that, when higher resistance contrasts are involved, a longer piece of the cable sheath will act as a current transmitter so that the lowest possible degree of diffusion resistance will automatically be produced. The basis for this is that the line resistance of a cable sheath is usually substantially lower (several decimal powers) than its diffusion resistance. The current follows the path of least resistance through the lowest diffusion resistance area and through the very low line resistance of the cable.

Even highly ohmic strata layers have only a limited thickness or depth. Therefore, a portion of the cable sheath will practically always be positioned in a low ohmic clay layer so that this arrangement will avoid the high diffusion resistance development tendencies of the conventional current-return-electrodes described above. In view of the length of the cable sheath it is not possible to experience the sudden alterations in diffusion resistance values that occur in the conventional current-return-electrodes and which tends to simulate in conventional methods a change in the stratum resistance apparently being recorded by the measuring electrode.

In accordance with another feature of the present invention, the measuring electrode itself is of such a design and construction that its potential is based upon an infinitely distant ground (at a potential of zero) and is maintained constant by means of a control system. Suitable locations for the positioning of the control electrodes will be apparent from the known data showing the potential distribution around two current electrodes in a three-dimensional conducting medium.

The invention, both as to its organization and manner of operation, together with further objects and advantages, will best be understood by reference to the following detailed description taken in conjunction with the accompanying drawing wherein:

FIG. 1, as indicated above, is a schematic diagram representing a typical measuring system of the prior art;

FIG. 2 shows a group of curves illustrating the effect of electrode shape and size upon diffusion resistances in a borehole of predetermined constant diameter, and FIG. 3 is a diagrammatic illustration of a downhole tool disposed within a portion of a borehole extending into the earth formations and characterized by the features of the present invention.

Referring now to FIG. 3, a downhole tool or measuring probe 1 is there shown as comprising, in a known manner, a measuring electrode 2 and a pair of elongated focusing electrodes 3 and 4 respectively disposed above and below the measuring electrode. The electrodes of this array are held in fixed position with respect to one another and so arranged that they can be raised and lowered by a cable within a borehole 15 which may be filled with conducting drilling mud. The cable comprising one or more central conductors surrounded by a conducting outer sheath 14 connects the downhole tool 1 to measuring circuits (not shown) at the surface. The measuring circuits are illustrated and described in U.S. Patents Nos. 2,967,272 and 3,068,401, for example. Insulation sections separate the measuring electrode 2 from the focusing electrodes 3 and 4 but one such section is shunted or spanned by a shunt resistor 5 of very low resistance. Through the shunt 5 passes that portion of the low frequency, A.C. current discharged by the measuring electrode into the stratum. As is described in the above-identified U.S. Patents Nos. 2,967,272 and 3,068,401 the current flow through the shunt resistor 5 is determined by measuring the potential drop and by passing the signal thus obtained through a combined calibration and switch circuit 6 which functions to impose calibrating values upon the signal or to supply the signal to a measurement amplifier and rectifier 7. The amplified measurements and calibration values are transmitted over the cable leads 16 and 17 to the surface where they are recorded in a conventional manner on film by a recording camera. The reference numeral 8 indicates a power supply which is excited by A.C. power from the surface and which produces all direct and alternating current voltages required for the operation of the electronic circuits of the downhole tool 1.

The blocks identified by the reference numerals 9, 10, and 11, taken together, indicate the control device by means of which the potential of the measuring electrode 2 is maintained, as far as possible, at a constant value with respect to a remote reference electrode 13 which is at zero potential. A constant voltage source 9 is used to supply a predetermined, low frequency AC voltage which is compared with a similar voltage obtained by measuring the potential difference between the focusing electrode 3 and the potential zero electrode 13. To this end, the control device 10 includes a voltage comparison circuit of conventional construction for comparing the voltage from the source 9 with the difference of potential between the electrodes 3 and 13 and for developing a unidirectional control signal whenever a differential exists between the two compared signals. The amplitude of the latter control signal is proportional to the magnitude of the differential and the polarity is determined by the direction of the deviation. Thus, if the difference of potential between electrodes 3 and 13 exceeds the voltage from the source 9 a control signal of one polarity is produced but if this difference of potential is less than the voltage from the source 9 a control signal of opposite polarity is developed. The control signal from the comparison circuit is applied to a low frequency generator 11 the output of which is connected by means of a lead 18 to the focusing electrode 3 and by means of a lead 19 to the metallic outer sheath of the measuring cable 14. The frequency of the signal developed by the generator 11 is equal to that from the source 9 and also to that of the measuring current from the electrode 2 and the amplitude is controlled by the signal from the control device 10. Thus, in the absence of a control signal from the device 10, that is, when the voltage from the source 9 is equal to the difference of potential between the electrodes 3 and 13, the signal from the generator 11 is of the proper amplitude to maintain the measuring electrode 2 at a predetermined potential. If there occurs a change in the potential of the measuring electrode 2 it will produce in the control device 10 a differential voltage of proper polarity to alter the amplitude of the signal developed by the generator 11 in a direction to drive the differential voltage back to zero.

The use of a very long current return electrode such as the cable sheath 14 eliminates the errors described above caused by sharp variations in diffusion resistance values. Thus, the measurements provided by the circuits in the surface equipment are much more accurate than those made by prior art systems using conventional current return electrodes.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. In an electrical well logging system for logging earth formations adjacent a borehole, said system being of the type employing a downhole tool carrying an electrode array comprising a current electrode and additional, electrically connected focusing electrodes disposed above and below the current electrode, low impedance means electrically connecting said current electrode and said focusing electrodes, current return means, a variable voltage source connected between the electrode array and said current return means for developing a survey current which passes through the earth formations adjacent the borehole, a potential pick-up electrode spaced from the current return means by sufficient distance to avoid the influence of the diffusion resistance of the current return means on said survey current and located at a point of zero potential, a constant voltage source for developing a control potential, means for comparing said control potential with the difference of potential between said electrode array and said potential pick-up electrode resulting from said survey current and for producing a control signal in response to any deviations therebetween, means responsive to the survey current flow from said current electrode through the earth formations adjacent the borehole to said current return means for producing measurements proportional to the conductivity of the earth formations, and means responsive to said control signal for controlling said variable voltage source to maintain said electrode array at a substantially constant potential with respect to zero potential, thereby to overcome the effect of the diffusion resistance of said current return means upon said measurements.

2. The apparatus defined by claim 1 wherein a cable extends through the well to the downhole tool and includes an elongated conducting means forming part of said current return means.

3. The apparatus defined by claim 2 wherein said cable includes a conducting outer sheath comprising said conducting means.

References Cited

UNITED STATES PATENTS

| | | | |
|---|---|---|---|
| 2,884,590 | 4/1959 | Welz | 324—1 |
| 3,017,566 | 1/1962 | Schuster | 324—10 X |
| 3,031,612 | 4/1962 | Easterling | 324—1 |
| 3,068,401 | 12/1962 | Janssen | 324—10 X |
| 3,103,626 | 9/1963 | Burton et al. | 324—10 X |
| 3,132,298 | 5/1964 | Doll et al. | 324—1 X |

RUDOLPH V. ROLINEC, *Primary Examiner.*

WALTER L. CARLSON, *Examiner.*

G. R. STRECKER, *Assistant Examiner.*